United States Patent [19]
Ho

[11] Patent Number: 5,376,318
[45] Date of Patent: Dec. 27, 1994

[54] PROCESS FOR MAKING HELMETS FOR CYCLISTS

[76] Inventor: Chang H. Ho, No. 659, Sec. 6, Chung Hwa Road, Hsin Chu, Taiwan, Prov. of China

[21] Appl. No.: 65,303

[22] Filed: May 24, 1993

[51] Int. Cl.$^5$ .............................................. B29C 67/22
[52] U.S. Cl. ................... 264/46.8; 264/46.4; 264/46.6; 264/132; 264/135; 264/156; 264/161
[58] Field of Search ................ 264/46.4, 46.6, 46.8, 264/156, 161, 132, 135

[56] References Cited

U.S. PATENT DOCUMENTS

| | | | |
|---|---|---|---|
| 3,950,483 | 4/1976 | Spier | 264/46.4 |
| 4,129,634 | 12/1978 | Cecka et al. | 264/46.6 |
| 4,228,211 | 10/1980 | Haazebroek | 156/240 |
| 4,288,268 | 9/1981 | Hartung | 264/219 |
| 4,473,208 | 9/1984 | Nava | 264/314 |
| 4,849,145 | 7/1989 | Hirsch | 264/46.4 |

Primary Examiner—Allan R. Kuhns
Attorney, Agent, or Firm—Lowe, Price, LeBlanc & Becker

[57] ABSTRACT

A process for making helmets for cyclists which includes steps of a) pre-heating a mold; b) putting a printing ink-coated plastic film or sheet to the lower die of the mold; c) letting the plastic film or sheet be heated to deform and to closely adhered to the cavity on the lower die; d) filling a polyurethane liquid; closing the upper die of the mold; e) putting the mold in a reactor for foaming; f) shape forming; g) mold stripping; i) trimming and vent hole making; and j) packing.

3 Claims, 2 Drawing Sheets

PROCESS FOR MAKING HELMETS FOR CYCLISTS

BACKGROUND OF THE INVENTION

The present invention relates to a process for making helmets for cyclists from foamed polyurethane.

A variety of helmets are known and widely used in different situations or places for protecting the head. The helmets for motorcyclists or cyclists are commonly made through a lot of complicated processing procedures, and therefore their manufacturing cost is high. Further, these helmets are commonly heavy and will make the head uncomfortable due to poor ventilation, motorcycle or bicycle riders are unwilling to wear them. In order to let motorcyclists or cyclists to wear a helmet while riding a motorcycle or bicycle, a lightweight safety helmet having good ventilation and high impact strength is needed.

Polyurethane has been known good for making a helmet being satisfactory in function. Polyurethane is any of various synthetic polymers produced by the polymerization of a hydroxyl (OH) radical and an NCO ground from two different compounds: used in elastic fibers, cushions, insulation, molded products, coatings, etc. Foamed polyurethane has been widely used for making insulating roof plates, packings for refrigerators and coolers and motor vehicles, mechanical spare parts for machinery and motor vehicles, etc., for the advantages of high elasticity and deformability, and high compression strength.

Through a specially designed production process, a satisfactory, lightweight safety helmet can be made from polyurethane. Because foamed polyurethane is highly deformable and can immediately return to its former shape after the external pressure has been released, it is a good way to use foamed polyurethane for making a safety helmet.

There are helmet manufacturers who use foamed polyurethane to make safety helmets for motorcyclists and cyclists by fastening a molded plastic outer shell to a molded inner shell of foamed polyurethane. This process is complicated.

SUMMARY OF THE INVENTION

The principal object of the present invention is to provide a helmet production process which directly bonds a plastic film (sheet) to a foamed polyurethane during the forming and shape forming of polyurethane. Another object of the present invention is to provide a helmet production process which has utilization value in industrial production. Still another object of the present invention is to provide a helmet production process through which lightweight safety helmets having good ventilation and high impact strength can be made.

DETAILED DESCRIPTION OF THE PREFERRED EMBODIMENT

Figure 2:
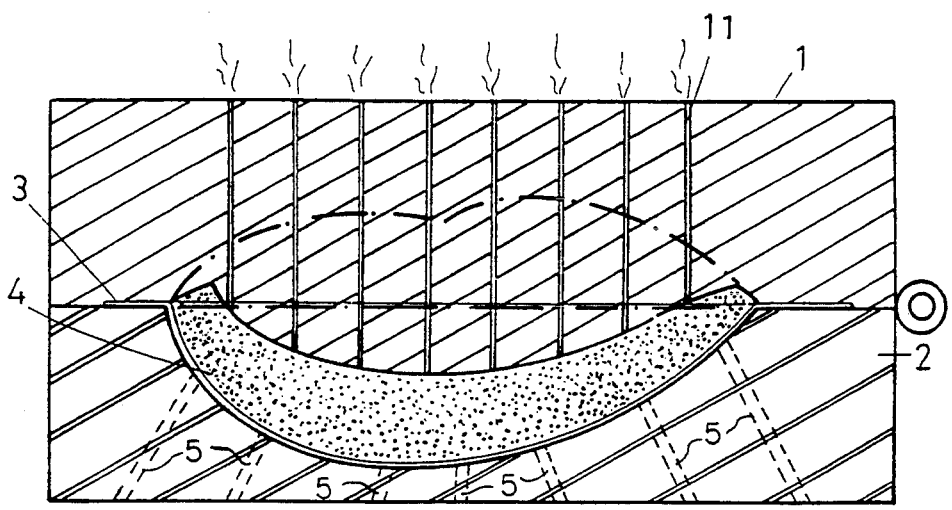
FIG. 2 is a sectional view of a helmet molding mold according to the present invention, showing the molding of a helmet.

Referring to FIG. 2, a helmet according to the present invention is made by covering an ink-coated plastic film (sheet) 3 over a pre-heated lower die 2, then covering the upper die 1 to the lower die 2, and then filling the prepared liquefied polyurethane mixture 4 into the cavity of the mold for foaming. After the process of foaming, the printed plastic film (sheet) 3 is bound to the foamed polyurethane 4 (the ink serves as a bonding agent) and formed into a covering layer over the helmet thus obtained- The lower die 2 of the mold is for molding the outer configuration the helmet while the upper die 1 of the mold is for molding the inner configuration of the helmet. Air holes 11 are made through the upper die 1 for the escape of air during the process of molding. Holes 5 are provided in lower mold 2 for drawing film 3 into the cavity thereof by suction.

Figure 1:
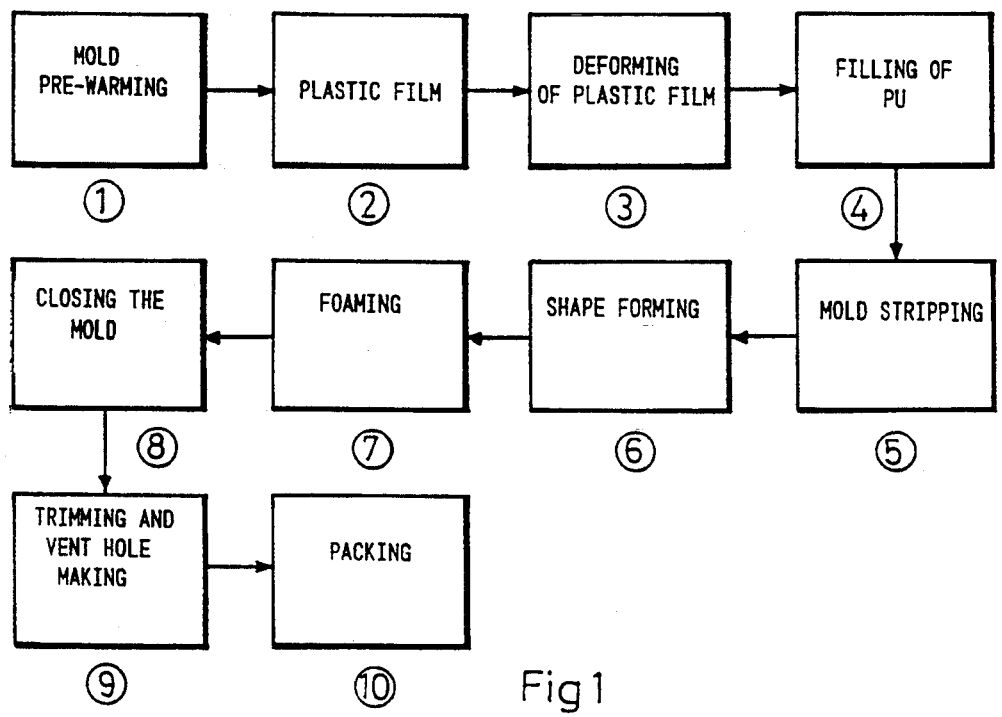
FIG. 1 is a block diagram showing the production flow of the process of the present invention.

Referring to FIG. 1, the process of the present invention includes steps of:

a) preparing a mold consisting of an upper die and a lower die and keeping the upper and lower dies warmed at 40°-60° C.;

b) covering a plastic film (sheet) over the lower die and coating it with a printing ink;

c) letting the ink-coated plastic film (sheet) be heated to deform and to become closely adhered to the cavity of the lower die;

d) filling a prepared liquefied polyurethane mixture into the recessed space defined within the ink-coated plastic film (sheet);

e) closing the upper die;

f) sending the mold in a reactor for foaming the polyurethane mixture under the reactor temperature of 120°-150° C. and the mold temperature of 70°-90° C. (when foamed, a pressure about 8Br-15Br is produced to squeeze the plastic film or sheet against the cavity of the lower die, and at the same time the gas thus produced is drawn off the mold through the air holes on the upper die);

g) keeping the mold temperature at 70°-90° C. for about 8-20 minutes for permitting the polyurethane mixture to be completely foamed and bound to the ink-coated plastic film (sheet) so that the foamed polyurethane and the ink-coated plastic film (sheet) are formed into a semi-finished helmet;

h) removing the mold from the reactor and then removing the semi-finished helmet from the mold for cooling in the air;

i) trimming the semi-finished helmet and making vent holes and recessed according to a predetermined pattern and then surface-treating the semi-finished helmet;

j) attaching a sponge rubber to the helmet thus made around the inside wall and then fixing a fastening device to the helmet.

Figure 3:
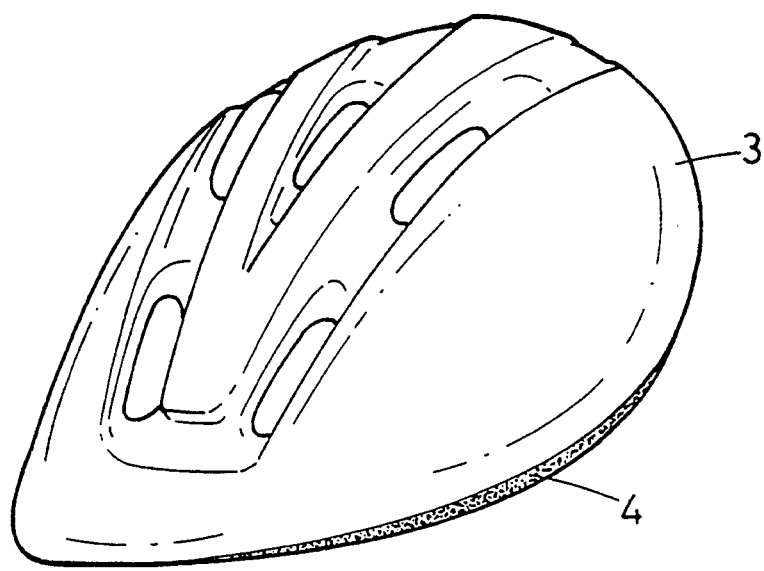
FIG. 3 shows a finished product according to the present invention.
Figure 4:
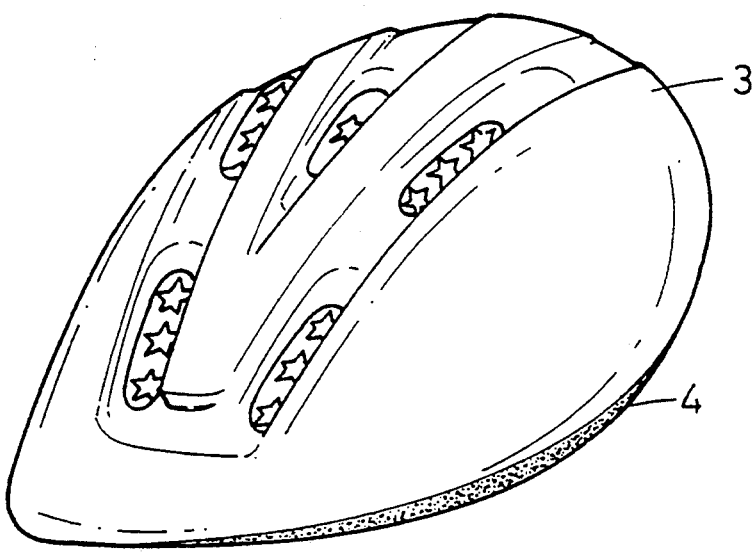
FIG. 4 shows another finished product according to the present invention.

FIGS. 3 and 4 illustrate two differently patterned helmets made according to the aforesaid process. A cutting mold may be used during the aforesaid step i) to cut the semi-finished helmet and make vent holes and recesses on it efficiently. When a thicker plastic sheet is used and covered over the lower die during the aforesaid step b), a vacuum pump device may be used for causing the plastic film to deform and to be adhered to the cavity on the lower die quickly by employing a downward suction force to the plastic sheet at the bottom through holes on the lower die. Further, when a plastic sheet is used, it may be pre-molded into the configuration of a helmet fitting the cavity on the lower die, and therefore the aforesaid steps c) and i) can be eliminated.

As indicated, a helmet according to the present invention is made of foamed polyurethane through a molding process, and therefore it is light and heat-insulative and has a high impact strength and a high shock absorbing ability. Because a plastic film or sheet is directly bound to the foamed polyurethane during the foaming, a smooth and brilliant outer shell is simultaneously formed when the foaming process is completed, and therefore no any further process is needed to cover an outer shell over the shape-molded foamed polyurethane. Therefore, the present invention greatly improves the manufacturing efficiency of the helmet.

What is claimed is:

1. A helmet making process comprising steps of:
   a) preparing a mold consisting of an upper die and a lower die according to the shape of a helmet and heating the mold to 40°-60° Cl;
   b) covering a plastic film or sheet over said lower die and coating the film or sheet with a printing ink;
   c) letting said ink-coated plastic film or sheet be heated to deform and to become closely adhered to a cavity on said lower die by employing a downward suction force to said ink-coated plastic film or sheet at the bottom through holes on said lower die;
   d) filling a prepared liquefied polyurethane mixture into said lower die over said ink-coated plastic film or sheet;
   e) closing said upper die;
   f) placing the mold in a reactor for foaming said polyurethane mixture under a reactor temperature of about 120° C.–150° C. and a mold temperature of about 70° C.–90° C.;
   g) keeping the mold temperature at 70° C.–90° C. for about 8–20 minutes permitting said polyurethane mixture to be completely foamed;
   h) removing said mold from said reactor and then removing the semi-finished helmet thus obtained from said mold for cooling in air;
   i) trimming said semi-finished helmet and making vent holes therein according to a predetermined pattern and then surface-treating said semi-finished helmet; and
   j) attaching sponge rubber to said helmet around an inner the inside wall thereof and then fixing ornaments and fastening means to said helmet.

2. The helmet making process of claim 1 wherein said lower die is for molding an outer wall of said helmet, and said upper die is for molding the inner wall of said helmet.

3. A helmet making process comprising steps of:
   a) preparing a mold consisting of an upper die and a lower die according to the shape of a helmet and heating the mold to 40°-60° C.;
   b) inserting a shape-molded plastic shell in a cavity in said lower die and coating the shell with a printing ink;
   c) filling said shape-molded plastic shell with a prepared liquefied polyurethane mixture;
   d) closing said upper die;
   e) placing the mold in a reactor for foaming said polyurethane mixture under a reactor temperature of about 120° C.–150° and a mold temperature of about 70° C.–90° C.;
   f) keeping the mold temperature at 70° C.–90° C. for about 8–20 minutes permitting said polyurethane mixture to be completely foamed;
   g) removing said mold from said reactor and then removing said semi-finished helmet thus obtained from said mold for cooling in air;
   h) attaching sponge rubber to said helmet around an inner the inside wall thereof and then fixing ornaments and fastening means to said helmet.

* * * * *